March 28, 1967 G. P. SCOTT 3,311,766
HIGH RESPONSE ACTUATORS
Filed Aug. 7, 1964 3 Sheets-Sheet 1

Inventor
Gifford P. Scott
By his Attorney
Carl E. Johnson.

March 28, 1967  G. P. SCOTT  3,311,766
HIGH RESPONSE ACTUATORS
Filed Aug. 7, 1964  3 Sheets-Sheet 2

March 28, 1967  G. P. SCOTT  3,311,766
HIGH RESPONSE ACTUATORS
Filed Aug. 7, 1964  3 Sheets-Sheet 3

United States Patent Office 3,311,766
Patented Mar. 28, 1967

3,311,766
HIGH RESPONSE ACTUATORS
Gifford P. Scott, Beverly, Mass., assignor to United Shoe Machinery Corporation, Flemington, N.J., and Boston, Mass., a corporation of New Jersey
Filed Aug. 7, 1964, Ser. No. 388,065
9 Claims. (Cl. 310—83)

This invention relates to electrical actuators of the high response type, and more particularly to the provision of improved armature construction for electric motors employing electromagnetic forces to propagate a circumferential wave of radial deflection. It will be understood that, although the invention is herein illustrated and described with respect to preferred embodiments thereof, the invention is not thus limited.

In a copending application, Ser. No. 258,734, filed Feb. 15, 1963 in the names of Herbert W. Proctor et al., now Patent No. 3,169,202, there is disclosed an electromagnetic actuator having a number of uniquely favorable operating characteristics, especially an unusually low inertia. This advantageous result arises because, of its three essential parts, namely, a stator reaction ring, a coaxial flextube, and a polyphase rotating field (or switched D.C. input means) for deflecting the flextube into engagement with the ring at spaced points and progressing these points of circumferential engagement, only the flextube rotates as an output member, at a speed much reduced from that of the field, and with negligible inertia. An important factor in successfully designing an efficient actuator of this type is the reduction of magnetic air gap loss in an armature carrying the flux from the stator ring and backing up the flextube which must remain radially flexible throughout 360°. Alternate armature constructions are disclosed in the Proctor et al. application cited above, one of the more generally useful, yet simple, forms comprising thin, flat shim stock coiled somewhat in the manner of a clock spring, but with very little air gap between successive convolutions.

In view of the foregoing it is a primary object of this invention to provide a more efficient magnetic circuit of the so-called "clock spring" type for an electromagnetic actuator having a sinusoidal or switched D.C. input.

Another object of this invention is to provide a novel actuator of this general type which, without loss of efficiency or power output, will operate more quietly.

To the ends just stated and in accordance with a feature of the invention, there is provided, in an actuator having a reaction stator ring and a coaxial flextube cooperative therewith at spaced circumferential points of engagement, an improved armature means for carrying flux produced by the stator ring to deflect the flextube and progress the mentioned points of engagement, the armature means including an annular series of magnetically conductive laminations disposed on the side of the flextube opposite the stator ring and at least one closely wound radially deflectable coil of magnetically conductive material circumferentially bearing on the laminations and engageable edgewise therewith to facilitate the flow of flux.

A further feature of the invention resides in the provision of at least one fastener radially extending through the armature coil (and through the flextube when so desired) to insure against any tendency to unwinding of the coil turns during reversal of rotation of the actuator.

Yet another feature of the invention pertains to the provision, in combination with a "clock spring" type of armature coil, of laminations axially engageable with the coil and annularly arranged to complete a flux path while bearing radially on the flextube, and the circumferential space between the coil and the flextube being occupied by resilient sound deadening material.

The above and other features of the invention, together with novel details and arrangements of parts, will now be described more particularly in connection with illustrative embodiments thereof and with reference to the accompanying drawings, in which.

Figure 1:
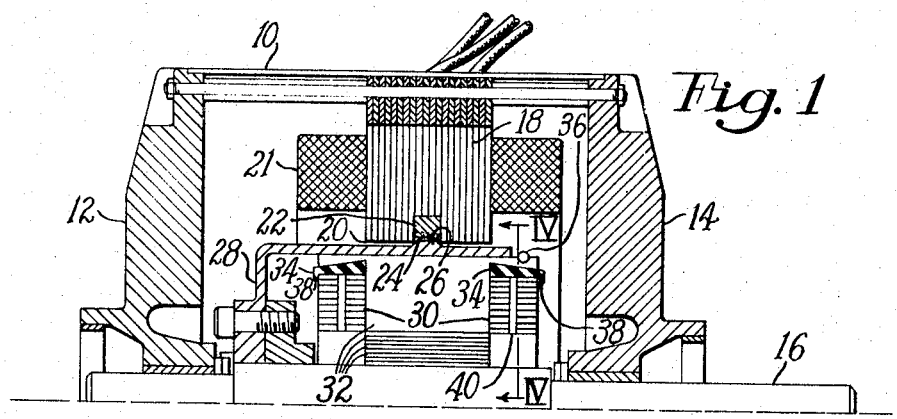
FIG. 1 is an axial section of an electromagnetic actuator having an armature including a plurality of T-shaped segments and a pair of "clock spring" coils.
Figure 7:
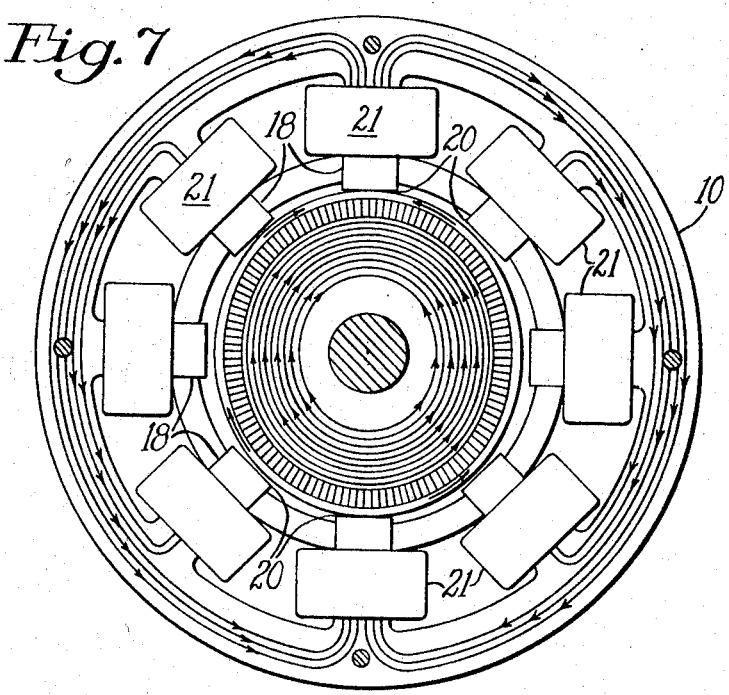
FIG. 7 is a somewhat schematic vertical section taken on FIG. 1 to indicate paths of flux at a moment of stator energization.

In FIG. 1 a motor housing 10 includes a pair of end caps 12, 14 in which an output shaft 16 is rotatably journaled. Mounted within the housing 10 is a stator comprising a laminated core 18 providing a plurality of circularly arranged and diametrically disposed poles 20 (FIGS. 1 and 7). Each successive pair of opposed poles is energized in sequence by a polyphase circuit, or a switched D.C. input, connected to conventional field winding 21 to provide a rotating magnetic field.

Figure 4:
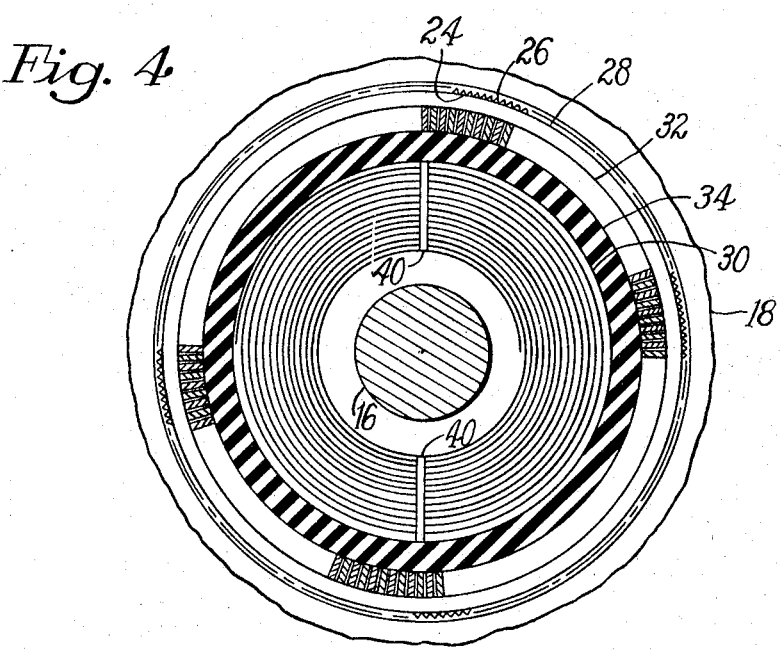
FIG. 4 is a section taken on the line IV—IV of FIG. 1.

Formed on the stator itself, or on an annular insert 22 secured therein, are circularly disposed spline teeth 24 (FIGS. 1, 4) which are arranged to engage with similar spline teeth 26, less in number, on the circumference of a flexspline 28. The latter is secured at its closed end to the output shaft 16. The reaction spline teeth 24 and the flexspline teeth 26 are coaxial with the output shaft. As in the construction disclosed in the above mentioned Proctor et al. patent, the function of the stator magnetic field is to radially deflect flexspline teeth 28 into engagement with the circular spline teeth at spaced circumferential localities, and to propagate these localities of engagement circumferentially. Although not illustrated herein, non-toothed localities of engagement between a flextube and stator would be similarly driven by friction.

For providing more effective and more efficient flux paths (the arrows in FIG. 7 indicating schematically the divided path when a pair of diametrically opposed poles 20 has been energized) the actuator of FIG. 1 includes an armature comprising, in addition to a pair of spaced, coiled conductive windings 30, 30 preferably of flat shim stock, an intermediate annular series of substantially flat, T-shaped conductive laminations 32. The coils serve to maintain the cross bars of the laminations 32 in engagement at all times with the inner wall of the radially deflectable flexspline 28, an annular retaining ring 34 preferably of rubber or rubber like material serving as a sound deadening cushion between each of the coils and the cross bars. A rubber ring 36 (FIG. 1) may be used to hold the laminations 32 in assembled relation upon removal from the actuator. It is to be especially noted that a circumferential lip 38 of each retaining ring 34 maintains the inner edges of the convolutions of each coil in snug, magnetically conductive engagement with the laminations 32 thereby insuring that the full strength of the flux field is carried without any appreciable magnetic air gap loss. Pins 40 (FIGS. 1, 4) radially extending diametrically through the coils 30, respectively, preserve their radial deflectability and prevent any tendency to "unwinding" or binding effect upon reversal of direction of the rotating field.

Figure 2:
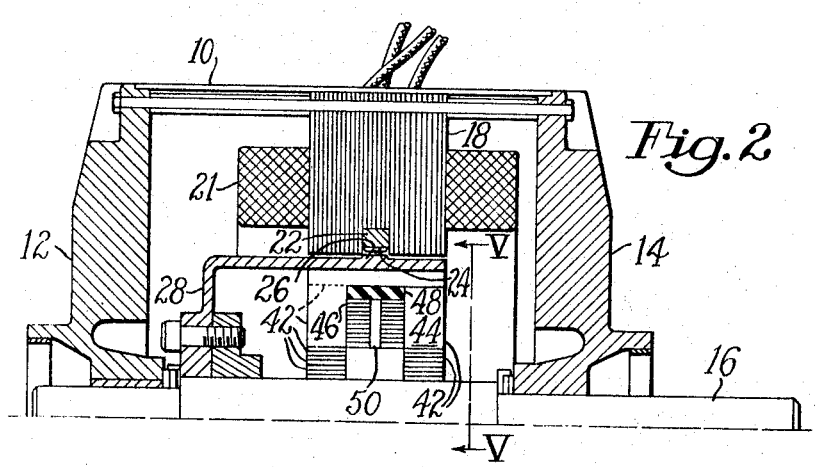
FIG. 2 is a view similar to FIG. 1 but with a modified armature wherein a single "clock spring" coil and L-shaped segments are employed.
Figure 5:
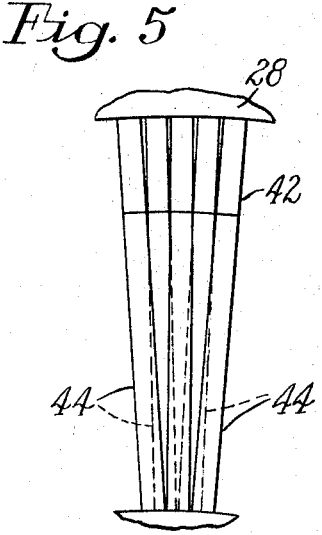
FIG. 5 is a detail view as seen when looking at armature segments in the direction of the arrows 5—5 in FIG. 2.
Figure 6:
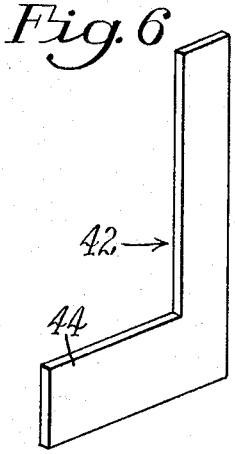
FIG. 6 is a perspective view of a single L-shaped armature segment.

In FIG. 2 except for armature structure now to be described an actuator somewhat similar to that of FIG. 1 is shown. Armature laminations 42 (FIGS. 2, 5, 6) of flat, conductive material and individually L-shaped are annularly arranged. In order to avoid a binding effect on one another yet provide ample conductive material and minimal air gaps, the radially disposed legs 44 (FIG. 5) of the successive laminations 42 are circumferentially staggered. Thus as may be seen in FIG. 5, the legs 44 are alternately disposed on opposite axial sides of an intermediate "clock spring" type coil 46. Axial edges of the coil convolutions are accordingly in effective conductive engagement with the laminations despite their radial displacements. An annular ring 48 of resilient rubber or other sound deadening material may be provided externally of the coil 46 for backing the center portions of the axial legs of the laminations 42 against the flexspline 28. The axial width of the legs 44 preferably corresponds to that of the radially adjacent pole face portion to accommodate flux saturation. A pair of diametric pins 50, one only shown in FIG. 2, holds the coil 46 against unwinding tendency at motor reversal.

Figure 3:
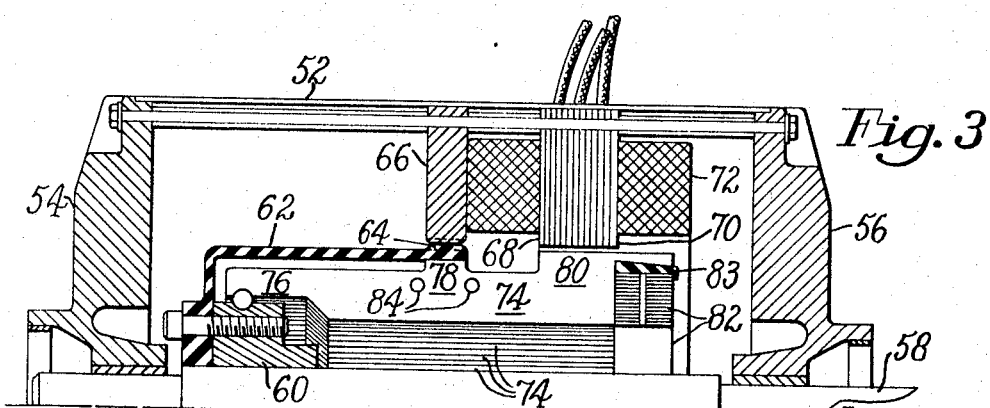
FIG. 3 is an axial section of an electromagnetic harmonic drive employing a non-conducting flexspline deflectable by an armature comprising an annular series of axial levers backed by a coil spring the convolutions of which are axially engageable endwise therewith.
Figure 8:
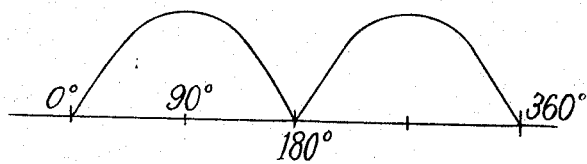
FIG. 8 is a diagram indicating the sinusoidal flux flow at a stator pole throughout a cycle of 360°, an elliptoidal wave generator being used.

FIG. 3 shows an actuator somewhat resembling, in combination, those of FIGS. 1 and 2 and an actuator disclosed in a copending application Ser. No. 258,707, filed Feb. 15, 1963 in the names of Willard B. Spring et al., now issued as Patent No. 3,169,201. A housing 52 includes a pair of end caps 54, 56, in which an output shaft 58 is rotatably journaled. Affixed to a collar 60 secured on the shaft 58 is a non-conductive flexspline 62 provided with spline teeth 64 annularly formed thereon at its open end. Differing from the structures of FIGS. 1 and 2, a separate, rigid, circular reaction spline gear 66 is secured in the housing 52 for cooperation, at spaced circumferential localities, with the flexspline teeth 64. For effecting such cooperation a stator having a laminated core 68 providing diametrically opposed pole faces 70 (one shown) is energized by a sinusoidal polyphase circuit (or switched D.C. input) connected to a conventional winding 72. Sinusoidal flux density at a pole face 70 (or corresponding faces in FIGS. 1 and 2) varies during rotation of the magnetic field as indicated in FIG. 8, the greatest strength occurring at the instant when the major axis of a flexible armature provides minimum air gap. In the FIG. 3 arrangement the armature comprises an annular series of axially disposed laminations or levers 74 having, respectively, an end portion 76 pivotally bearing on the collar 60, a midportion 78 engageable with the open end of the flexspline 62 opposite to the circular spline 66, and a flux conducting portion 80. To complete the flux path effectively a "clock spring" type of armature coil 82 is retained in close edgewise engagement with the flux conducting portions 80 by means of a non-conductive resilient retaining wedge 83 similar to that shown in FIG. 1. Loops of non-conducting strands 84 may be used to hold the flat levers 74 in somewhat loosely assembled relation.

In the embodiments shown in FIGS. 1–3, effective radial displacements of the wave circumferentially propagated in the flexspline (or, more correctly, a flextube if no spline teeth are employed) are accomplished by a flux-carrying radially deflectable armature including magnetically conductive laminations annularly arranged and at least one coil of magnetically conductive material engageable edgewise with the laminations. Axial width of the coil(s) is selected to be ample for saturated magnetic field strength. Continuous edgewise engagements of the coil turns and the laminations in each case avoids the detrimental high reluctance associated with air gaps in a magnetic circuit. Thus the small annular air gap hitherto found between the inner wall of a flexspline or flextube and the outer turn of a "clock spring" coil, as well as in air gaps between successive convolutions, which acted as a serious obstacle to flux flow, are no longer of appreciable significance. Accordingly a greater flux density may now be accommodated economically; high response and greater power output for a given electrical input to these actuators are achieved since the continuous edgewise contact of the coil turns permits easy passage of even the maximum flux occurring cyclically at each pole.

Having thus described my invention, what I claim as new and desire to secure by Letters Patent of the United States is:

1. In an electromagnetic actuator having a reaction ring, a coaxial flextube cooperative therewith at spaced circumferential points of engagement, and a stator energizable to provide a rotatable magnetic field for progressing said points of engagement thus to drive the flextube, the improvement comprising the provision of armature means including an annular series of conductive laminations disposed on the side of the flextube opposite the reaction ring, and at least one radially deflectable coil of magnetically conductive material the convolutions of which are engageable edgewise with said laminations to facilitate the flow of flux.

2. An actuator as set forth in claim 1 wherein the deflectable coil is of flat, conductive metal turns, and at least one pin is radially disposed in said turns to prevent their unwinding.

3. An actuator as set forth in claim 1 wherein resilient sound deadening material is disposed in annular space between the coil and an axial portion of the laminations.

4. An actuator as set forth in claim 3 wherein the sound deadening material has an annular lip formed to retain edges of the coil in axial engagement with the laminations.

5. An actuator as set forth in claim 1 wherein each lamination is T-shaped.

6. An actuator as set forth in claim 1 wherein each lamination is L-shaped.

7. An actuator as set forth in claim 6 wherein the L-shaped laminations have their radial leg portions alternately disposed axially.

8. A magnetically responsive armature for radially deflecting circumferentially a flextube coaxial therewith, said armature including an annular series of conductive laminations individually movable toward and from a common axis and having an arm extending axially, and a conductive coil of flat turns resiliently bearing on the arms, the turns of the coil axially engaging the laminations edgewise to provide a flux path therewith.

9. A high response type actuator comprising a housing, an output shaft journaled therein, a circular reaction member secured in the housing and coaxial with said shaft, a non-conductive flextube having a closed end in driving relation to the shaft and an open end deflectable into spaced circumferential engagements with the member, and means including a rotatable magnetic field stator and an armature responsive thereto for propagating said spaced circumferential engagements, said armature having a plurality of annularly disposed, pivotally mounted levers each having an intermediate portion for radially acting on the flextube in the vicinity of its open end, and a conductive coil engageable edgewise in the vicinity of said stator with end portions of the levers remote from their pivotal mounting.

References Cited by the Examiner

UNITED STATES PATENTS

| 3,169,201 | 2/1963 | Spring et al. | 310—83 |
| 3,169,202 | 2/1963 | Procter | 310—83 |

MILTON O. HIRSHFIELD, *Primary Examiner.*

J. M. MILLER, *Assistant Examiner.*